United States Patent [19]

Jungesjo

[11] 4,384,466
[45] May 24, 1983

[54] HYDRAULIC CONTROL CIRCUIT FOR LOADER OF THIN-WALL SPLINE ROLLING MACHINE

[75] Inventor: Harald N. Jungesjo, Rochester, Mich.

[73] Assignee: Anderson-Cook, Inc., Fraser, Mich.

[21] Appl. No.: 238,285

[22] Filed: Feb. 23, 1981

[51] Int. Cl.³ .................. B21D 9/14; B21D 17/00; B21D 53/28
[52] U.S. Cl. ............................ 72/88; 72/125; 72/422; 72/420; 279/1 G
[58] Field of Search .................... 72/88–90, 72/420, 422, 125, 24; 279/1 G; 29/159.2

[56] References Cited

U.S. PATENT DOCUMENTS

| | | | |
|---|---|---|---|
| 3,362,059 | 1/1968 | Ponio et al. | 72/105 |
| 3,631,704 | 1/1972 | Leonard | 72/102 |
| 3,982,415 | 9/1976 | Killop | 72/88 |
| 4,155,237 | 5/1979 | Jungesjo | 72/88 |

Primary Examiner—Daniel C. Crane

Attorney, Agent, or Firm—Reising, Ethington, Barnard, Perry, Brooks & Milton

[57] ABSTRACT

A hydraulic control circuit (10) for operating a loader (12) of a machine for splining an annular thin-wall sleeve of a power transmission member is disclosed as including valving (116) for communicating supply and return conduits (102,116) with load and unload cylinders (14,16) to provide loading and unloading movements. Load and unload valves (118,120) of the valving have load cycle positions where the load cylinder drives both the loading and unloading members (26,28) which clamp a thin-wall member during such movement to provide loading thereof for splining. In an unload cycle position of the valves, both the load and unload cylinders are hydraulically driven in an unloading direction opposite to the loading movement. The loading and unloading members (26,28) are moved away from each other by their associated cylinders in an index cycle of the valves to permit indexing of a load table (30) under the operation of an index valve (162) of the circuit.

7 Claims, 3 Drawing Figures

HYDRAULIC CONTROL CIRCUIT FOR LOADER OF THIN-WALL SPLINE ROLLING MACHINE

TECHNICAL FIELD

This invention relates to a hydraulic control circuit that operates a loader for a machine having apparatus for splining an annular thin-wall sleeve of a power transmission member.

BACKGROUND ART

U.S. Pat. No. 3,982,415, which is assigned to the assignee of the present invention, discloses a machine having apparatus for splining an annular thin-wall sleeve of a power transmission member by meshing die and mandrel teeth with the sleeve located therebetween such that the resultant forming thereof provides the splines. This spline forming process takes place in a rolling manner as a toothed mandrel on which the power transmission member is mounted rotates upon movement of toothed dies in opposite directions on opposite sides of the mandrel to provide the tooth meshing. An end wall of the power transmission member is clamped against an end of the mandrel during the splining process so as to insure precise forming of the resultant splines. Clutch hubs for automatic transmissions of road vehicles is one usage for which this spline forming process has particular utility in replacing prior impacting operations used to form clutch hub splines, as is discussed in the aforementioned patent.

U.S. Pat. No. 4,155,237, which is also assigned to the assignee of the present invention, discloses apparatus for automatically loading and unloading power transmission members on a toothed mandrel for splining of thin-wall sleeves thereof by meshing of the die and mandrel teeth in the manner discussed above. Loading and unloading members driven by associated hydraulic cylinders are provided to cooperatively clamp and move power transmission members to be splined from a load table toward and away from the mandrel. Both cylinders are hydraulically driven during the loading movement toward the mandrel and during the unloading movement away from the mandrel back toward the load table. After movement of the splined power transmission member back to the load table, the loading and unloading members are moved away from each other to permit indexing of the load table for alignment of another member to be splined with the loading and unloading members.

DISCLOSURE OF INVENTION

The present invention provides a novel hydraulic control circuit for operating a loader for loading and unloading thin-wall power transmission members on a toothed mandrel for splining thereof by a pair of toothed dies upon meshing of die and mandrel teeth with the thin-wall member between the meshing teeth.

The loader operated by the hydraulic control circuit of the invention includes a load table for indexing thin-wall members into alignment with the mandrel for loading thereof and for receiving the splined thin-wall members after the splining operation. Loading and unloading members of the loaders are respectively connected to pistons of load and unload cylinders and cooperate to move thin-wall members from the load table to the mandrel for splining and subsequently from the mandrel back to the load table after the splining. A rotatable clamp of the loading member cooperates with the unloading member during the loading movement to clamp the thin-wall member therebetween and cooperates with the mandrel to clamp the thin-wall member during the splining operation.

The hydraulic control circuit of this invention operates the load and unload cylinders to move the loading and unloading members during the loader operation. A high pressure supply conduit of the circuit feeds pressurized hydraulic fluid from a pump to the cylinders, and a low pressure return conduit of the circuit receives hydraulic fluid from the cylinders. Valving of the control circuit communicates opposite sides of the load and unload cylinder pistons with the conduits. The valving has a load cycle position where the load cylinder piston is hydraulically driven to move the loading member from the load table toward the mandrel while moving the unloading member with a thin-wall member to be splined clamped between the clamp of the loading member and the unloading member to provide loading thereof on the mandrel for splining. The valving also has an unload cycle position where both the load and unload cylinder pistons are hydralically driven so as to move the loading and unloading members in a direction away from the mandrel to unload a splined thin-wall power transmission member.

In the preferred mode of the hydraulic control circuit, the valving includes a load valve that operates the load cylinder and an unload valve that operates the unload cylinder. The load valve communicates the opposite sides of the load cylinder piston with the supply and return conduits in both the load and unload cycle positions but in opposite orientations so as to provide oppositely directed hydraulic driving of the loading member. In the load cycle position, the unload valve communicates the opposite sides of the unload cylinder with the return conduit to permit the driving of the unloading member by the hydraulic driving of the loading member under the impetus of the load cylinder. In the unload cycle position, the unload valve communicates the opposite sides of the unload cylinder with the supply and return conduits to provide hydraulic driving of the unloading member away from the mandrel.

Between loading operations, the load and unload cylinders move the loading and unloading members away from each other for an index cycle of the load table. The load valve has an index cycle position that communicates the opposite sides of the load cylinder piston with the return conduit. The unload valve has an index cycle position that communicates the opposite sides of unload cylinder piston with the supply and return conduits in the opposite orientation as in the unload cycle position so as to hydraulically drive the unloading member away from the loading member.

A load table valve of the circuit is associated with the load table and has a load-unload position that isolates the load table from both the supply and return conduits and an index cycle position for communicating the load table with the supply and return conduits to provide indexing of the load table. A previously splined thin-wall member is moved out of alignment with the loading and unloading members upon the indexing as the next thin-wall member to be splined is moved into alignment therewith in preparation for loading.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
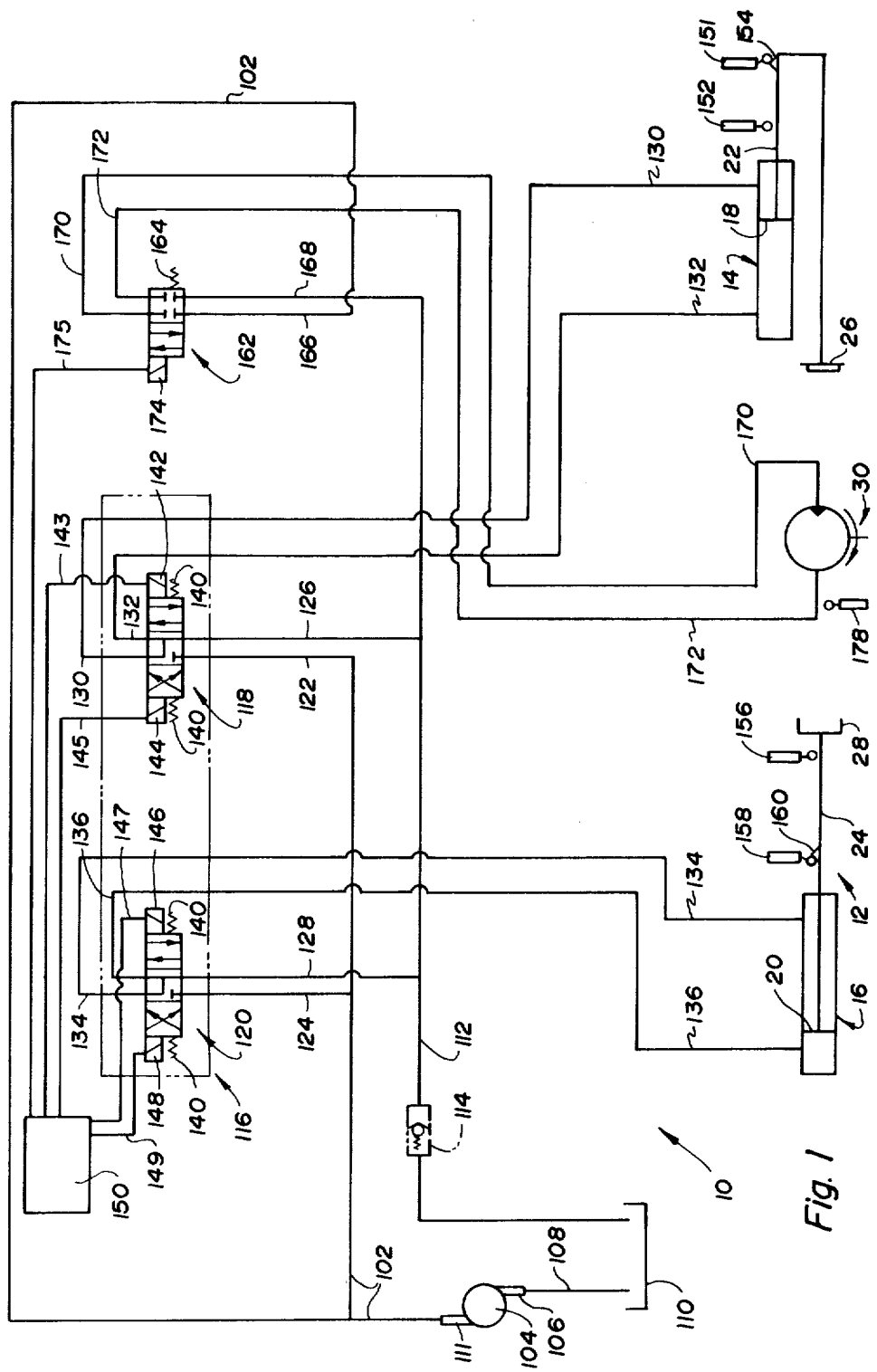
FIG. 1 is a schematic view of a hydraulic control circuit in accordance with the invention for operating a loader for loading thin-wall power transmission members to be splined.

Referring to FIG. 1 of the drawings, a hydraulic control circuit generally indicated by 10 is constructed in accordance with the present invention and operates a schematically indicated loader 12 to provide loading of thin-wall power transmission members for a splining operation as well as unloading of the splined thin-wall members. Load and unload cylinders 14 and 16 of loader 12 have associated pistons 18 and 20, respectively, whose rods 22 and 24 are connected to loading and unloading members 26 and 28. Cooperation of the loading and unloading members 26 and 28 moves thin-wall members to be splined from a schematically indicated load table 30 and returns the splined members to the load table in preparation for the next cycle.

Figure 2:
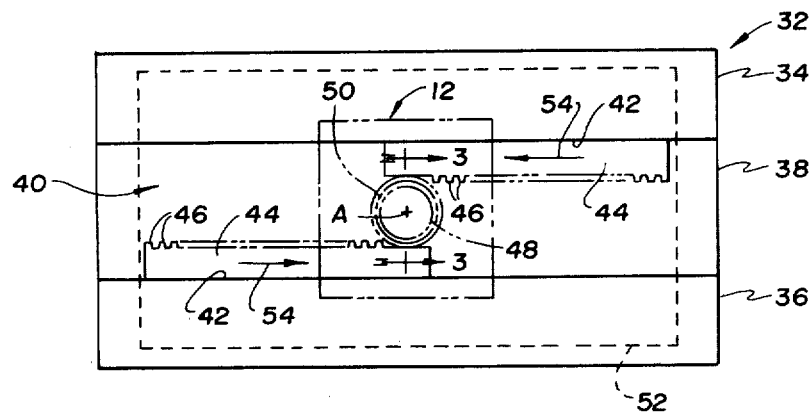
FIG. 2 is a front elevation view of a machine including apparatus for splining thin-wall members upon loading thereof under the control of the hydraulic circuit.

Referring to FIG. 2, a spline forming machine generally indicated by 32 is loaded and unloaded by loader 12 under the control of the hydraulic circuit. Upper and lower bases 34 and 36 of the machine 32 are interconnected by a vertically extending connecting portion 38 and project forwardly therefrom so as to define a workspace 40 where thin-wall spline forming is performed. Conventional slideways 42 on the upper and lower bases 34 and 36 mount upper and lower toothed dies embodied by upper and lower racks 44 with associated forming faces having teeth 46 spaced along the lengths thereof between leading and trailing ends of the racks. An externally toothed mandrel 48 that is rotatably mounted within the workspace 40 about an axis of rotation A receives an annular thin-wall power transmission member 50 to be splined by operation of the loader 12. A schematically indicated drive mechanism 52, such as of the type disclosed by the United States patent of Anderson U.S. Pat. No. 3,793,866, moves the toothed racks 44 in the direction of arrows 54 from their end-to-end relationship shown into an overlapping relationship in order to perform the splining. Such movement of the toothed racks in opposite directions to each other on opposite sides of the axis A meshes the die and mandrel teeth with an annular thin-wall sleeve of the power transmission member 50 therebetween in order to perform the thin-wall splining. Drive mechanism 52 subsequently moves the toothed racks 44 in the opposite direction as arrows 54 back to the end-to-end position shown for unloading of the splined member 50 by the loader 12.

Figure 3:
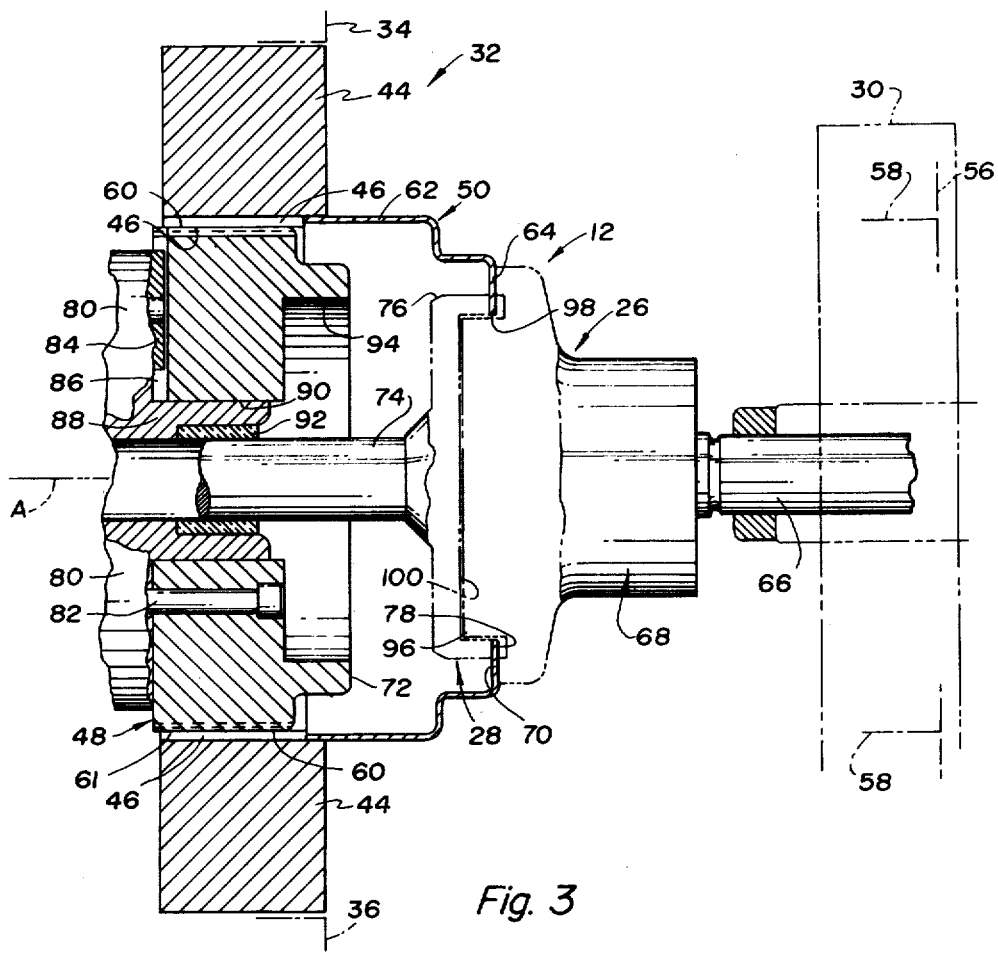
FIG. 3 is a partially sectioned view taken generally along the direction of line 3—3 in FIG. 2 to illustrate loading and unloading members of the loader operated by the hydraulic control circuit.

Referring to FIG. 3, loader 12 moves each power transmission member 50 to be splined from the load table 30 to a mounted position on the mandrel 48 for the splining operation and thereafter moves the splined power transmission member back to the load table in preparation for the next cycle. Load table 30 is generally of the type disclosed by U.S. Pat. No. 4,155,237 and includes a schematically illustrated index carriage 56 having sets of workpiece positioners 58 for locating power transmission members received by the carriage. Indexing of carriage 56 moves each set of positioners 58 initially into alignment with an unshown input chute to receive a power transmission member 50 therefrom, thereafter into alignment with the loader 12 along the axis of mandrel rotation for the splining operation, and subsequently into alignment with an output chute to deliver the splined power transmission member to a suitable storage bin. Operation of the loader 12 moves the power transmission member 50 in alignment therewith from the load table 30 onto the mandrel 48 such that meshing of the die teeth 46 and teeth 60 of the mandrel provides the splining of an annular thin-wall sleeve 62 of the power transmission member in the manner previously described. An annular end wall 64 of the power transmission member is clamped between the loading and unloading members 26 and 28 during the movement onto the mandrel for the splining and is moved thereby after the splining from the mandrel back to the load table in preparation for the next cycle.

Movement of the loading and unloading members 26 and 28 as shown in FIG. 3 takes place along the axis A of mandrel rotation. Loading member 26 includes a shaft 66 connected to the piston rod of the hydraulic load cylinder and also includes a rotatable clamp 68 which has an annular clamping surface 70 that clamps the end wall 64 of the thin-wall member 50 against an end 72 of the mandrel 48 during the splining operation. Unloading member 28 includes a shaft 74 connected to the piston rod of the unload cylinder and also has an enlarged head 76 mounted on the end of the shaft 74. An annular clamping surface 78 of the unloading member head 76 cooperates with the clamping surface 70 on the loading member clamp 68 to engage the end wall 64 of the thin-wall member 50 to provide both loading and unloading.

Mandrel 48 shown in FIG. 3 is mounted on a spindle 80 for rotation about the axis A and is secured thereto by a plurality of bolts 82 (only one shown) and by a key 84 that is secured to the spindle and received within a radial slot 86 in the mandrel. An annular extension 88 of the spindle 86 is received within a central opening 90 of the mandrel and supports a bushing 92 that permits the unloading member shaft 74 to move axially along the mandrel rotational axis A during the loading and unloading movements. An enlarged end 94 of the mandrel opening 90 receives the enlarged head 76 of the unloading member 28 during the splining operation such that the clamping surface 70 of the loading member clamp 68 can clamp the end wall 64 of the thin-wall member 50 being splined against the mandrel end 72. A locator 96 of a round shape on the loading member clamp 68 is received within a round opening 98 in the end wall 64 of the thin-wall member 50 so as to provide accurate location thereof during the loading operation onto the mandrel and is also received within a round depression 100 in the enlarged head 76 of the unloading member 28 to permit the clamping of the end wall by the clamping surfaces 70 and 78.

With reference to FIG. 1, the hydraulic control circuit 10 for operating the loader 12 includes a high pressure supply conduit 102 for feeding pressurized hydraulic fluid to the load and unload cylinders 14 and 16. A hydraulic pump 104 has an inlet 106 connected to a conduit 108 that is fed from a tank 110 of hydraulic fluid and has an outlet 111 that is connected to conduit 102. Control circuit 10 also includes a low pressure return conduit 112 that receives hydraulic fluid from the cylinders 14 and 16 for flow back to the tank 110. A spring biased check valve 114 of the return conduit 112 maintains a predetermined low pressure in the return conduit. Valving 116 of the circuit communicates the opposite sides of the load and unload cylinder pistons 18 and 20 with the supply and return conduits 102 and 112 to operate the loader 12. As is more fully hereinafter described, the valving 116 has a load cycle position where the load cylinder piston 18 has its right side communicated with the supply conduit 102 and its left side communicated with the return conduit 112 so as to be hydraulically driven toward the left which corresponds to a direction from the load table 30 toward the mandrel on which the splining is performed as previously discussed. Such movement of the loading member 26 toward the left provides the impetus for driving the unloading member 28 toward the left with a thin-wall member to be splined clamped between the rotatable clamp of the loading member and the unloading member, as previously described, in order to provide loading thereof for the spline forming operation. Valving 116 of the control circuit also has an unload cycle position where the left sides of both the load and unload cylinder pistons 18 and 20 are communicated with the supply conduit 102 and their right sides are communicated with the return conduit 112 so as to be hydraulically driven toward the right in order to drive both the loading and unloading members 26 and 28 in a direction away from the mandrel to unload a splined thin-wall power transmission member for movement back to the load table 30.

With continuing reference to FIG. 1, the valving 116 of the control circuit preferably includes a load valve 118 that operates the load cylinder 14 and an unload valve 120 that operates the unload cylinder 16. Branches 122 and 124 of the high pressure supply conduit 102 respectively communicate the load and unload valves 118 and 120 to the outlet of the pump 104. Branches 126 and 128 of the return conduit 112 respectively communicate the load and unload valves 118 and 120 with the tank 110 through the check valve 114 for return of hydraulic fluid. Conduits 130, 132 and 134, 136 respectively communicate the load and unload valves 118 and 120 with the oppositely facing right and left sides of the load and unload cylinder pistons 18 and 20. Both the load and unload valves 118 and 120 include valve elements that are each biased by an associated pair of biasing springs 140 to a center position. Solenoids 142,144 and 146,148 respectively associated with the load and unload valves 118 and 120 are connected by electrical conduits 143,145 and 147,149 to an electrical control circuit 150 to actuate valve element movement against the bias of springs 140.

In the load cycle position, the load valve 118 has its solenoid 142 actuated so as to move the valve element thereof toward the left such that pressurized hydraulic fluid is fed from the high pressure conduit 102 through its branch 122 and through valve 118 to conduit 130 for flow to the right side of the load cylinder piston 18. The left side of the load cylinder piston 18 is then communicated by conduit 132 through the load valve 118 to the branch 126 of the return conduit 112 in order to permit fluid to be returned to the tank 110 as the loading member 26 is hydraulically driven toward the mandrel to load a thin-wall member to be splined. Load valve 118 also has an unload cycle position where the solenoid 144 is actuated to move the valve element thereof toward the right so as to communicate the branch 122 of the high pressure conduit 102 with conduit 132 in order to supply pressurized hydraulic fluid to the left side of the load cylinder piston 18 and thereby hydraulically drive the loading member 26 toward the right. Conduit 130 which is communicated with the right side of the load cylinder piston 18 is then also communicated through the load valve 118 with the branch 126 of the return conduit 112 to permit the return of hydraulic fluid to the tank 110 as the loading member 28 is driven away from the mandrel. Also, load valve 118 has an index cycle position where the valve element thereof is positioned at the central location shown such that both sides of the load cylinder piston 18 are communicated with the return conduit 112. The differential area of the load cylinder piston 18 as a result of the connection of the rod 22 to its right side and the slight pressure in the return conduit 112 provides a bias of this piston toward the right such that the loading member 26 is biased toward the right during the index cycle.

Unload valve 120 has a load cycle position where both solenoids 146 and 148 are unactuated such that the valve element thereof is in the center location shown such that the branch 128 of the return conduit 112 is communicated through the unload valve by conduits 134 and 136 with the opposite sides of the unload cylinder piston 20. Since the unload cylinder piston 20 has a differential area on its opposite sides as a result of the connection of the rod 24, there is a slight bias of this piston toward the right in the load cycle position due to the pressure of the return conduit fluid. However, the driving force of the load cylinder applied through the loading member 26 overcomes the slight force on the unloading member 28 and thereby moves the unloading member toward the mandrel with the thin-wall member clamped therebetween in the manner previously described. Unload valve 120 has an unload cycle position where the solenoid 148 is actuated to move the valve element thereof toward the right to communicate the branch 124 of the high pressure conduit 102 with the conduit 136 in order to feed pressurized hydraulic fluid to the left side of the unload cylinder piston 20. The unload valve 120 then also communicates the conduit 134 communicated with the right side of the piston 20 with the branch 128 of the return conduit 112 such that the unloading member 28 can be driven away from the mandrel to unload a previously splined thin-wall member. Also, unload valve 120 has an index cycle position where solenoid 146 is actuated to move the valve element thereof toward the left in order to communicate the branch 124 of the high pressure conduit 102 with the conduit 134 so as to feed pressurized hydraulic fluid to the right side of the unload cylinder piston 20. The unload valve 120 then communicates the conduit 136 that is communicated with the left side of piston 20 with the branch 128 of the return conduit 112 for return of fluid such that the unloading member 28 is driven away from the loading member 26 and maintained out of contact with the load table 30 for an index cycle.

Limit switches 151 and 152 as well as a tripper 154 on the piston rod 22 of the load cylinder 14 and limit switches 156 and 158 as well as a tripper 160 on the piston rod of the unload cylinder 16 cooperate to control operation of the valves 118 and 120 through the electrical control circuit 150.

Hydraulic control circuit 10 also includes a load table valve 162 whose valve element is biased by a spring 164 to a load-unload position, as shown, where a branch 166 of the high pressure supply conduit 102 and a branch 168 of the load pressure return conduit 112 are both isolated from conduits 170 and 172 that are communicated with a hydraulic actuator of the load table 30. A solenoid 174 of the load table valve 162 is connected by an electrical conduit 175 with the electrical control circuit 150 and is actuated to move the valve element of this valve toward the right against the bias of the spring 164 in order to feed pressurized hydraulic fluid from the high pressure branch 166 to the conduit 170 and thus to the load table actuator for indexing movement. Return hydraulic fluid is then fed by the conduit 172 through the valve 162 to the branch 168 of the return conduit 112 for flow back to the tank 110. A limit switch 178 is actuated by a suitable tripper of the load table after completion of the indexing cycle.

CYCLE OPERATION

A complete description of the load cycle operation will be described to facilitate an understanding of the operation of the hydraulic control circuit 10 shown in FIG. 1. Both the load and unload valves 118 and 120 are in the index cycle position prior to indexing with the loading and unloading members 26 and 30 positioned on opposite sides of the load table 30 such that indexing can be performed. Thus, both solenoids 142 and 144 of the load valve 118 are unactuated so that the load cylinder piston 18 is biased toward the right by the fluid pressure of the return conduit 112 acting on the differential piston area, and the unload valve 120 has its solenoid 146 actuated so that high pressure fluid from conduit 102 is supplied to the right side of the unload cylinder piston 20 to provide driving and positioning thereof toward the mandrel away from the load table. After each indexing cycle of the load table 30, tripping of the switch 178 actuates the electrical control circuit 150 so as to commence a loading operation. Loading is commenced by initially actuating the solenoid 148 of the unload valve 120 to drive the unloading member 28 in the unloading direction and into engagement with the next thin-wall member to be splined at the load table 30 whereupon limit switch 156 is tripped to deactuate the solenoid 148 and thus center the load valve 120 and to also actuate the solenoid 142 of the load valve 118 for positioning in its load cycle position such that high pressure fluid is supplied to the right side of the load cylinder piston 18 to drive the loading member 26 toward the load table 30. Upon engaging the next thin-wall member to be splined, the driving of the loading member 26 clamps the thin-wall member in cooperation with the unloading member 28 and moves the unloading member against the bias of the low pressure return fluid acting on the differential area of the piston 20 such that the thin-wall member is loaded on the mandrel for the spline forming operation. Upon reaching the mandrel, switch 152 of the load cylinder piston 152 is tripped to indicate that splining can begin while maintaining the supply of high pressure fluid to the right side of the load cylinder piston 18 such that the rotatable clamp of the loading member 26 clamps the thin-wall member against the mandrel as previously discussed.

After the splining operation is completed, a suitable switch of the machine operated the electrical control circuit 150 to actuate solenoids 144 and 148 of the load and unload valves 118 and 120 to provide positioning thereof in their unload cycle positions and consequent hydraulic driving of both the loading and unloading members away from the mandrel back to the load table. Upon reaching the load table, the loading member 26 continues to be hydraulically driven away from the mandrel until tripper 154 trips switch 151 whereupon the load valve 118 is moved to its index cycle position with the loading member 26 biased to the right by the return fluid pressure acting on the differential area of the load cylinder piston 18. Upon unloading member 28 reaching the load table 30, the tripper 160 trips switch 156 to deactuate the solenoid 148 and actuate the solenoid 146 of the unload valve 120 such that the unload cylinder piston 20 is driven back toward the left away from the load table and then trips the switch 158. With both switches 151 and 158 tripped, the electrical control circuit 150 actuates the solenoid 174 to index the load table 30 whereupon tripping of the switch 178 upon completion of the indexing commences the next cycle.

For a complete understanding of the construction of the loading and unloading member 26 and 28, reference should be made to my copending application Ser. No. P-322 which is being filed concurrently herewith and assigned to the assignee of the present invention.

While the best mode for practicing the invention has been described in detail, those familiar with the art to which this invention relates will recognize various alternative designs and embodiments for practicing the invention as defined by the following claims.

What is claimed is:

1. In a loader for loading thin-wall power transmission members on a toothed mandrel for splining thereof by a pair of toothed dies upon meshing of the die and mandrel teeth with the thin-wall member therebetween, said loader being mounted adjacent the mandrel during use and including a load table for indexing thin-wall members into alignment with the mandrel for loading thereof and for receiving the thin-wall members after splining thereof, a loading member mounted for movement between the load table and the mandrel and including a rotatable clamp, an unloading member mounted for movement between the load table and the mandrel, and load and unload cylinders having associated pistons respectively connected to the loading and unloading members, a hydraulic control circuit connected to the load and unload cylinders to provide operation thereof, said hydraulic control circuit comprising: a high pressure supply conduit; a low pressure return conduit; and valving for communicating opposite sides of the load and unload cylinder pistons with the conduits to selectively feed pressurized hydraulic fluid from the supply conduit to the cylinders while also feeding hydraulic fluid from the cylinders to the return conduit, said valving having a load cycle position where the load cylinder piston is hydraulically driven to move the loading member from the load table toward the mandrel while moving the unloading member with a thin-wall member to be splined clamped between the clamp thereof and the unloading member to provide loading thereof for splining, and the valving having an unload cycle position where both the load and unload cylinder pistons are hydraulically driven so as to move the loading and unloading members in a direction away from the mandrel to unload a splined thin-wall power transmission member.

2. In a loader having a circuit as in claim 1 wherin the valving includes: (a) a load valve that communicates the opposite sides of the load cylinder piston with the supply and return conduits in both the load and unload cycle positions but in opposite orientations so as to provide oppositely directed hydraulic driving of the loading member; and (b) an unload valve that (1) communicates the opposite sides of the unload cylinder piston with the return conduit in the load cycle position to permit driving of the unloading member by the loading member, and (2) communicates the opposite sides of the unload cylinder piston with the supply and return conduits in the unload cycle position to provide hydraulic driving of the unloading member.

3. In a loader having a circuit as in claim 2 wherein the load valve has an index cycle position that communicates the opposite sides of the load cylinder piston with the return conduit.

4. In a loader having a circuit as in claim 2 wherein the unload valve has an index cycle position that communicates the opposite sides of the unload cylinder piston with the supply and return conduits in the opposite orientation as in the unload cycle position so as to hydraulically drive the unloading member away from the loading member.

5. In a loader for loading thin-wall power transmission members on a toothed mandrel for splining thereof by a pair of toothed dies upon meshing of the die and mandrel teeth with the thin-wall member therebetween, said loader being mounted adjacent the mandrel during use and including a load table for indexing thin-wall members into alignment with the mandrel for loading thereof and for receiving the thin-wall members after splining thereof, a loading member mounted for movement between the load table and the mandrel and including a rotatable clamp, an unloading member mounted for movement between the load table and the mandrel, and load and unload cylinders having associated pistons respectively connected to the loading and unloading members, a hydraulic control circuit connected to the load and unload cylinders to provide operation thereof, said hydraulic control circuit comprising: a high pressure supply conduit; a low pressure return conduit; load and unload valves for respectively communicating the load and unload cylinders with the supply and return conduits to selectively feed pressurized hydraulic fluid from the supply conduit to the cylinders while also feeding hydraulic fluid from the cylinders to the return conduit; said load and unload valves having load cycle positions where the opposite sides of the load cylinder piston are respectively communicated with the supply and return conduits and where the opposite sides of the unload cylinder piston are both communicated with the return conduit such that the load cylinder drives both the loading and unloading members from the load table toward the mandrel with a thin-wall power transmission member to be splined clamped therebetween; and said load and unload valves having unload cycle positions where the opposite sides of both the load and unload cylinder pistons are respectively communicated with the supply and return conduits such that the load and unload cylinders respectively drive the loading and unloading members in a direction away from the mandrel toward the load table so as to unload a splined thin-wall power transmission member.

6. In a loader for loading thin-wall power transmission members on a toothed mandrel for splining thereof by a pair of toothed dies upon meshing of the die and mandrel teeth with the thin-wall member therebetween, said loader being mounted adjacent the mandrel during use and including a load table for indexing thin-wall members into alignment with the mandrel for loading thereof and for receiving the thin-wall members after splining thereof, a loading member mounted for movement between the load table and the mandrel and including a rotatable clamp, an unloading member mounted for movement between the load table and the mandrel, and load and unload cylinders having associated pistons respectively connected to the loading and unloading members, a hydraulic control circuit connected to the load and unload cylinders to provide operation thereof, said hydraulic control circuit comprising: a high pressure supply conduit; a low pressure return conduit; a load valve having (a) a load cycle position that communicates the opposite sides of the load cylinder piston with the supply and return conduits to provide driving of the loading member in a loading direction from the load table toward the mandrel, (b) an unload cycle position that communicates the opposite sides of the load cylinder piston with the supply and return conduits to provide driving of the loading member in an unloading direction from the mandrel toward the load table, and (c) an index cycle position where the opposite sides of the load cylinder piston are communicated with the return conduit; and an unload valve having (a) a load cycle position that communicates the opposite sides of the unload cylinder piston with the return conduit to permit driving of the unloading member in the loading direction by the loading member, (b) an unload cycle position that communicates the opposite sides of the unload cylinder piston with the supply and return conduits to provide driving of the unloading member in the unloading direction, and (c) an index cycle position where the opposite sides of the unload cylinder piston are communicated with the supply and return conduits in the opposite orientation as the unload cycle position so as to hydraulically drive the unloading member away from the loading member.

7. In a loader having a circuit as in claim 6 further including a load table valve having a load-unload position that isolates the load table from both the supply and return conduits and also having an index cycle position for communicating the load table with the supply and return conduits to provide indexing of the load table.

* * * * *